United States Patent [19]

Tateoka

[11] Patent Number: 4,634,232

[45] Date of Patent: Jan. 6, 1987

[54] LIGHT SOURCE DEVICE FOR CLOSE SPACING OF TWO LIGHT BEAMS

[75] Inventor: Masamichi Tateoka, Yokohama, Japan

[73] Assignee: Canon Kabushiki Kaisha, Tokyo, Japan

[21] Appl. No.: 574,123

[22] Filed: Jan. 26, 1984

[30] Foreign Application Priority Data

Feb. 1, 1983 [JP] Japan .................................. 58-15678

[51] Int. Cl.$^4$ .............................................. G02B 27/10
[52] U.S. Cl. .............................. 350/394; 219/121 LQ; 350/401; 350/403
[58] Field of Search ................ 350/173, 379, 381, 394, 350/400–403; 369/54, 110, 116, 122; 219/121 LP, 121 LQ; 372/25, 27

[56] References Cited

U.S. PATENT DOCUMENTS

| 2,449,287 | 9/1948 | Flood | 350/400 |
| 2,672,786 | 3/1954 | Capstaff | 350/286 |
| 3,753,608 | 8/1973 | Bernal | 350/403 |
| 4,380,694 | 4/1983 | Dyson | 219/121 LP |

FOREIGN PATENT DOCUMENTS

| 68499 | 6/1978 | Japan | 219/121 LP |
| 132361 | 11/1978 | Japan | 350/401 |
| 857904 | 8/1981 | U.S.S.R. | 350/402 |

OTHER PUBLICATIONS

Jenkins et al, "Fundamentals of Optics", McGraw Hill 1950, pp. 23–25.

*Primary Examiner*—William H. Punter
*Attorney, Agent, or Firm*—Fitzpatrick, Cella, Harper & Scinto

[57] ABSTRACT

There is disclosed a light source device in which first and second semiconductor lasers are disposed relative to a polarizing beam splitter so that the laser beam from the first is transmitted while that from the second is reflected by the beam splitter, and that the major and minor directions in the cross section of the first beam are respectively co-ordinated with those of the second beam. An optical element capable of rotating the plane of polarization of an incident beam by approximately 90° is disposed between one of the semiconductor lasers and the polarizing beam splitter. In this manner the beams from the seconductor lasers can be guided, with respectively co-ordinated major and minor directions in the beam cross section, in the same direction without any decrease in the quantity of light.

3 Claims, 7 Drawing Figures

LIGHT SOURCE DEVICE FOR CLOSE SPACING OF TWO LIGHT BEAMS

BACKGROUND OF THE INVENTION

1. Field of the Invention

The present invention relates to a light source device capable of efficiently synthesizing a light beam from two semiconductor lasers.

2. Description of the Prior Art

Because of development in recent years, the semiconductor laser is employed as the light source in various applications such as a laser beam printer or an optical disk apparatus, or in optical communications. In such applications, it is already known to improve working efficiency by increasing the intensity of the light beam from the light source for obtaining a higher scanning speed or by employing plural beams.

SUMMARY OF THE INVENTION

An object of the present invention is to provide a light source device suitable for improving working efficiency.

Another object of the present invention is to provide a light source device capable of efficiently synthesizing light beams from two semiconductor lasers with a satisfactory sectional shape in the resulting synthesized beam.

The foregoing objects can be achieved according to the present invention by a device in which first and second semiconductor lasers are positioned relative to a polarizing beam splitter so that the laser beam from the first laser transmits through, the beam splitter while the beam from the second laser is reflected by the beam splitter, and that the major and minor direction in the section of the first beam coincide with those of the second beam, respectively, and in which a half-waveplate is disposed between one of the semiconductor lasers and the polarizing beam splitter for rotating the plane of polarization by 90°, thereby efficiently synthesizing the laser beams in said polarizing beam splitter.

In such arrangement, and if the lasers are arranged to have co-ordinated optical axes, the beam emerging from the polarizing beam splitter has a cross-sectional shape as if it were emitted from a single semiconductor laser. On the other hand, there may be obtained two beams with slightly displaced optical axes, if the semiconductor lasers are positioned with slightly displaced optical axes.

Furthermore, there may be provided a member for changing the direction of the central ray of either beam, disposed between the polarizing beam splitter and one of the semiconductor lasers, in order to obtain two different laser beam rays emerging from the polarizing beam splitter.

DETAILED DESCRIPTION OF THE PREFERRED EMBODIMENTS

Figure 1:
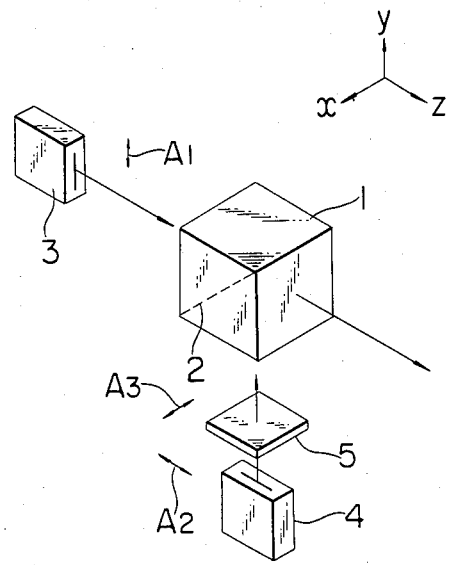
FIGS. 1 and 2 are schematic views showing embodiments of the light source device of the present invention.

FIG. 1 shows a light source device embodying the present invention, wherein a polarizing beam splitter 1 is provided with an interference film 2, which forms determined angles with the x-y plane and with the x-z plane and, is arranged to transmit an incident light beam polarized in a plane defined by said incident beam and a normal line to said interference film (such incident beam being referred to as a P-polarized beam) but reflect an incident light beam polarized in a plane perpendicular to the plane of the P-polarized beam (such incident beam being referred to as an S-polarized beam). A first semiconductor laser 3 is disposed so that the junction plane thereof is parallel to the y-z plane, and a second semiconductor laser 4 is disposed so that the junction plane thereof is also parallel to the y-z plane. The semiconductor laser 3 emits a light beam in the z-axis direction toward the interference film, and said beam transmits through the film because it is linearly polarized in the y-z plane as indicated by arrow $A_1$. A $\lambda/2$ waveplate 5 is provided between the semiconductor laser 4 and the polarizing beam splitter 1, so that the light beam emitted by said semiconductor laser 4 along the y-axis direction and polarized linearly in the y-z plane as indicated by arrow $A_2$ is converted, by said $\lambda/2$ waveplate 5, into a beam linearly polarized in the x-y plane as indicated by arrow $A_3$. Consequently, the light beam passing through the $\lambda/2$ waveplate 5 and entering the polarizing beam splitter is reflected into the z-axis direction by the interference film 2. In this manner, the beams from the semiconductor lasers 3, 4 are synthesized, with respectively coordinated major and minor directions in the beam cross section, without any decrease in the quantity of the light.

Figure 2:
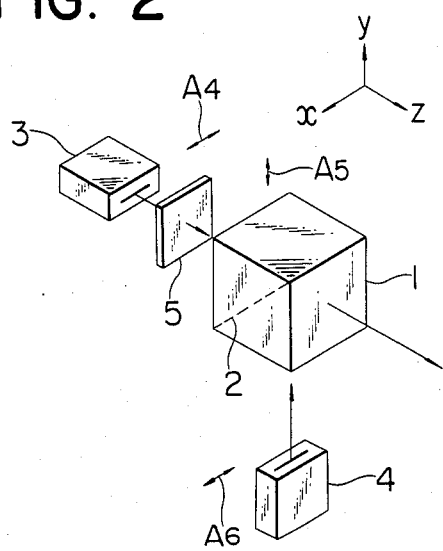

FIG. 2 shows another embodiment of the light source device of the present invention, wherein numerals 1 to 5 indicate components similar to those shown in FIG. 1. In the present embodiment, however, the directions of the junction planes of the semiconductor lasers and the position of the $\lambda/2$ waveplate with respect to the polarizing beam splitter are different from the foregoing embodiment. The first semiconductor laser 3 is disposed so that the junction plane thereof is parallel to the x-z plane while the second semiconductor laser 4 is disposed so that the junction plane thereof is parallel to the x-y plane. The light beam emitted from the first semiconductor laser along the z-axis and polarized linearly in the x-z plane as indicated by arrow $A_4$ is converted, by the $\lambda/2$ waveplate 5, into a beam linearly polarized in the y-z plane as indicated by arrow $A_5$ and transmits through the interference film 2 of the polarizing beam splitter 1. On the other hand the beam emitted by the semiconductor laser 4 along the y-axis and linearly polarized in the x-y plane as indicated by arrow $A_6$ is reflected into the z-axis direction by the interference film 2 of the polarizing beam splitter 1. In this manner, the beam from the semiconductor lasers 3, 4 are synthesized into a single beam, with respectively co-ordinated major and minor axes directions in the beam cross section without any decrease in the quantity of light.

Figure 3:
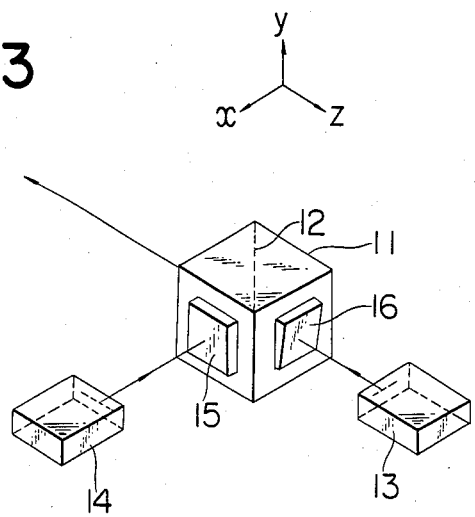
FIGS. 3 and 4 are schematic views showing another embodiment of the light source device of the present invention.
Figure 4:
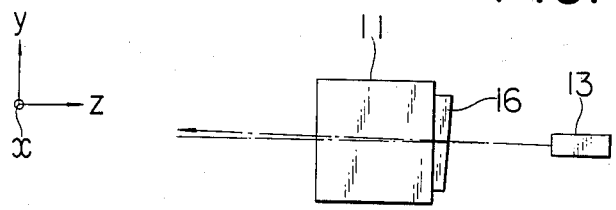

FIG. 3 shows another embodiment of the light source device of the present invention, in which the beams from the light sources separately emerge, without overlapping, from the polarizing beam splitter. In FIG. 3, a polarizing beam splitter 11 is provided with an interference film 12 which transmits or reflects an incident beam according to the state of polarization thereof and forms determined angles with the x-y plane and with the y-z plane. The interference film 12 is arranged so as to transmit the afore-mentioned P-polarized beam but reflect the S-polarized beam. A first semiconductor laser 13 is disposed so that the junction plane thereof is parallel to the x-z plane, and a second semiconductor laser 14 is arranged so that the junction plane thereof is also parallel to the x-z plane. The polarizing beam splitter 11 is provided with a half-waveplate 15 affixed thereto and an optical wedge 16 likewise affixed thereto, for slightly diverting the direction of the light beam in the y-axis direction in the y-z plane. FIG. 4 shows, in the y-z plane including the optical axis, the light source device of FIG. 3 wherein the light beam emitted from the light source 13 is diverted toward the y-axis direction in the y-z plane by means of the optical wedge 16.

Thus the light beam from the semiconductor laser 13, which is oscillated in the x-z plane, is transmitted by the polarizing beam splitter 11 after being slightly diverted by the optical wedge 16 in the above-described manner, while the light beam from the semiconductor laser 14, which is oscillated in the x-z plane, is converted by the half-waveplate into a beam which is oscillated in the y-z plane, and is then reflected by the aforementioned interference film 12 of the polarizing beam splitter 11 to the direction which is the same as that of the beam from the semiconductor laser 13. In this manner, the light source device provides two beams in which the major and minor axes directions in the beam cross section of one beam are coordinated with those of the other beam but the directions of the principal rays are slightly different.

Figure 5:
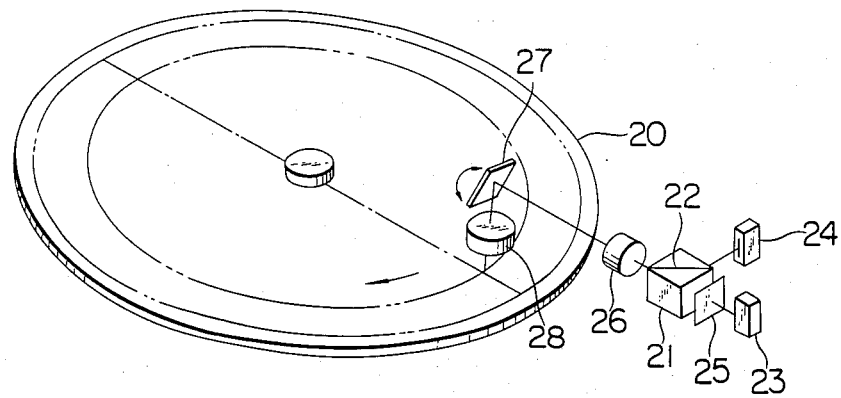
FIG. 5 is a schematic view showing an optical information recording apparatus employing the light source device of the present invention.

FIG. 5 schematically shows an embodiment of an optical information recording apparatus employing the light source device of the present invention. There are shown a recording medium 20 composed for example of an amorphous magnetic medium, a heatdeformable organic medium or a medium capable of forming a pit by heating; a polarizing beam splitter 21; an interference layer 22; semiconductor lasers 23, 24; and a half-waveplate 25, which are positioned as already explained in relation to FIG. 2. There are further shown a collimating lens 26 for collimating the light beams from the semiconductor lasers 23, 24; a tracking mirror 27; and an objective lens 28. The light beams emitted by the semiconductor lasers 23, 24 are synthesized by the polarizing beam splitter, then converted into a parallel beam by the collimating lens 26 and enters, by way of the tracking mirror 27, the objective lens 28 to be converged thereby onto said recording medium.

The intensity of the light beam for information recording on said recording medium is preferably stronger than that of the light beam for information reading from said recording medium. It is therefore possible to utilize the light beams from two semiconductor lasers 23, 24 in information recording and to use a light beam from either semiconductor laser in information reading for irradiating the recording medium and receiving the reflected light by means of the semiconductor laser itself to detect the changes in the quantity of reflection from the recording medium.

Figure 6:
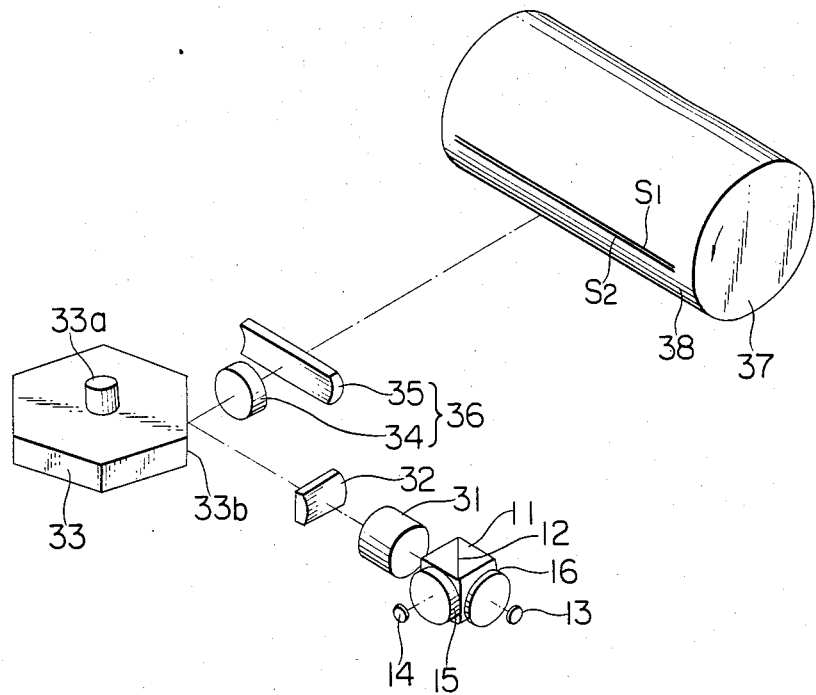
FIGS. 6 and 7 are schematic views showing an embodiment of a laser beam printer employing the light source device of the present invention.
Figure 7:
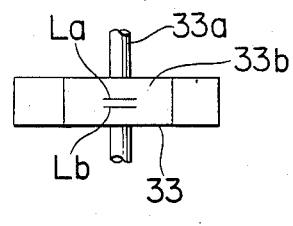

FIG. 6 shows an embodiment of a scanning recording apparatus employing the light source device of the present invention, wherein numerals 11 to 16 indicate components similar to those shown in FIG. 3. There are also shown a collimating lens 31 for collimating the light beams from the semiconductor lasers; a rotary polygonal mirror 33 for deflecting the incident light beam into determined directions; and a cylindrical lens 32 for collecting only the beam of one direction from among the light beams coming from said collimating lens. The direction of propagation of the light beam collected by said cylindrical lens has a component in a direction along the rotary axis 33a of said rotary polygonal mirror 33. Consequently, looking at the deflective-reflection plane 33b of the rotary polygonal mirror 33 from the light source device side, as shown in FIG. 7, there are linear images La, Lb formed in the vicinity of said plane 33b. A scanning-imaging lens system 36 having an anamorphic power for imaging the beam, deflected by the rotary polygonal mirror 33, into a spot beam is composed of a spherical single lens 34 and a toric lens 35. A rotary drum 37 is provided thereon with a photosensitive member, and is associated with known means disposed therearound (not shown) for forming a latent image on said photosensitive member and for developing said latent image into a visible image. $S_1$ and $S_2$ indicate scanning lines which are formed by the movement of the spot beams on said photosensitive member with the rotation of said rotary polygonal mirror.

Thus, two light beams emerging from the polarizing beam splitter 11 with a slight angle being defined between the principal rays thereof are converted by the collimating lens 31, respectively, into two parallel beams having a slight angle defined therebetween, and, after passing the cylindrical lens 32, are focused as two linear images La, Lb displaced from each other in the direction of the rotary axis of said rotary polygonal mirror, in the vicinity of the deflective-reflection plane 33b. The two beams deflected by the rotary polygonal mirror are focused as spot beams on the photosensitive member 38 by means of the scanning-imaging lens system 36. Said spot beams will move at a constant speed on the photosensitive member 38 if said scanning-imaging lens system 38 is provided with the f-$\theta$ characteristic. The positions of the scanning lines on the photosensitive member can be maintained constant even when the rotary axis 33a of the polygonal mirror 33 is inclined or when the deflective-reflection plane 33b of the polygonal mirror 33 contains an assembly error, if the photosensitive member is maintained optically conjugate with the vicinity of the deflective-reflection plane with respect to the lens system 36 in a plane including the optical axis of the lens system 36 and perpendicular to the deflection scan plane, namely a plane perpendicular to the plane formed by rotation of a normal line to the deflective-reflection plane of the rotary polygonal mirror.

The structure shown in FIG. 6 allows one to fully utilize the beam intensity from each semiconductor laser, while maintaining the distance of the spot beams on the photosensitive member at a desired space, for example at 1/16 mm if the secondary scanning pitch of the printer is 1/16 mm. Also the neighboring spot beams can have the same shape even when the full beam intensity from each semiconductor laser is utilized.

Furthermore, two beams are protected from formation of asymmetric aberrations, since the reflecting positions of the two beams on the deflective-reflection plane are substantially the same even when a tilt-correcting optical system is used in a conjugate arrangement.

It is furthermore possible, in the light source device shown in FIGS. 1 and 2, to obtain two beams of cross-sectional forms with respectively co-ordinated major an minor axes directions, by positioning, in the light path from the polarizing beam splitter 1, and optical member capable of varying the direction of optical path according to the state of the plane of polarization of the incident beam, such as a Wollaston's prism.

Furthermore, in a case of a scanning recording apparatus such as shown in FIG. 6, where may be provided a polarizing beam splitter disposed between the scanning-imaging lens system and the rotary drum 37, and another rotary drum in a position optically equivalent to that of said rotary drum 37 with respect to the aforesaid polarizing beam splitter, thereby guiding the beams of the semiconductor lasers to two rotary drums, respectively. Such an arrangement will be useful in the optical system for a color copying apparatus. In such case, the light source device shown in FIG. 1 or 2 is also usable.

In the embodiment shown in FIG. 3, the optical wedge 16 and the half-waveplate are positioned in different optical paths, but both may be positioned in the same optical path, for example between the semiconductor laser 14 and the polarizing beam splitter 11. Furthermore, the optical wedge 16 and the half-waveplate 15 may be replaced by an optical member capable of varying the direction of the principal ray and rotating the plane of polarization by 90°.

What I claim is:

1. A scanning apparatus comprising:

a polarizing beam splitter having a plurality of sides, said beams splitter adapted to include a interference film;

first and second semiconductor lasers for supplying light beams, each having major and minor cross-sectional axes and a central ray, to said interference film from first and second sides thereof, respectively, said first and second semiconductor lasers being disposed relative to said polarizing beam splitter so that the respective major and minor cross-sectional axes of the beams are coordinated with each other after passage through said polarizing beam splitter;

means disposed in an optical path between said first semiconductor laser and said polarizing beams splitter for rotating the plane of polarization of the incident light beam from said first semiconductor laser by approximately 90 degrees;

means positioned between one of said semiconductor lasers and said polarizing beams splitter for varying the direction of the central ray of the light beam supplied from said one of said semiconductor lasers;

optical means for imaging the light beams supplied, through said polarizing beams splitter, by said semiconductor lasers, on a light receiving surface; and means for causing relative movement between the light receiving surface and the light beams.

2. A scanning apparatus according to claim 1, wherein said varying means is disposed in an optical path extending from said second semiconductor laser.

3. A scanning apparatus according to claim 2, wherein said rotating means and said varying means are affixed to said polarizing beam splitter, respectively.

* * * * *